United States Patent [19]

Spirig

[11] 4,354,105

[45] Oct. 12, 1982

[54] CONTROL SYSTEM INCLUDING A TEMPERATURE-RESPONSIVE VARIABLE OPTICAL PARAMETER SENSOR

[76] Inventor: Ernst Spirig, P.O. Box 160, CH-8640 Rapperswil, Switzerland

[21] Appl. No.: 272,269

[22] Filed: Jun. 10, 1981

Related U.S. Application Data

[63] Continuation of Ser. No. 58,118, Jul. 16, 1979, abandoned.

[30] Foreign Application Priority Data

Jun. 21, 1979 [GB] United Kingdom ................ 7921635

[51] Int. Cl.³ .................... G01J 5/28; G01K 11/12; G01D 5/30
[52] U.S. Cl. ................................ 250/231 R; 356/43; 356/44
[58] Field of Search ............... 250/231 R, 229, 237 R; 350/351; 73/355 R, 356; 307/310; 328/3; 356/43–45

[56] References Cited

U.S. PATENT DOCUMENTS

| 3,719,789 | 3/1973 | Harnden, Jr. ................ 350/351 X |
| 4,119,845 | 10/1978 | Jaskolski et al. ............. 250/231 R |
| 4,278,349 | 7/1981 | Sander ........................... 356/45 X |

*Primary Examiner*—David C. Nelms
*Assistant Examiner*—Edward P. Westin
*Attorney, Agent, or Firm*—Laubscher, Philpitt & Laubscher

[57] ABSTRACT

A temperature responsive device, such as a fuse or a temperature measuring apparatus, is disclosed including a temperature sensor having a light reflective (or light transmissive) characteristic which varies with temperature, and a device for receiving the light reflected from (or transmitted through) the sensor and to provide an output in accordance with the state of the characteristic. As shown, the sensor (perhaps an adhesive temperature indicator) is used as a fuse and, upon its color-change, it interrupts a switch 2 connecting a power source to a load the temperature of which the sensor senses.

6 Claims, 6 Drawing Figures

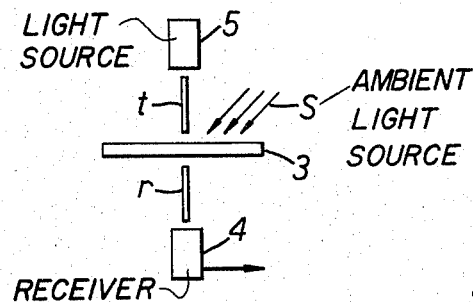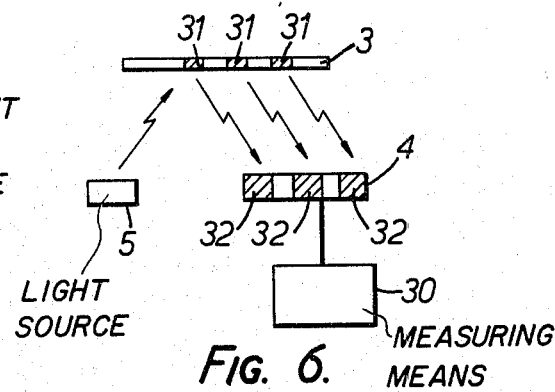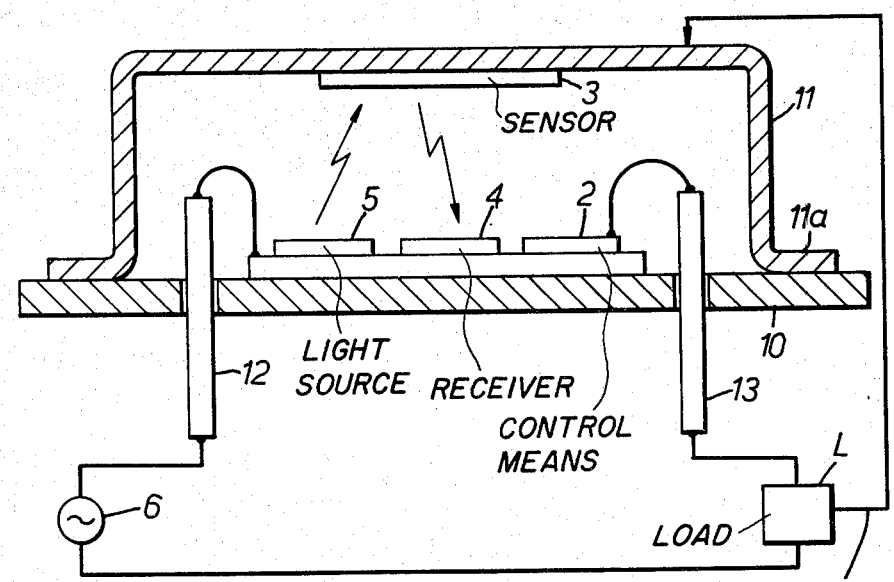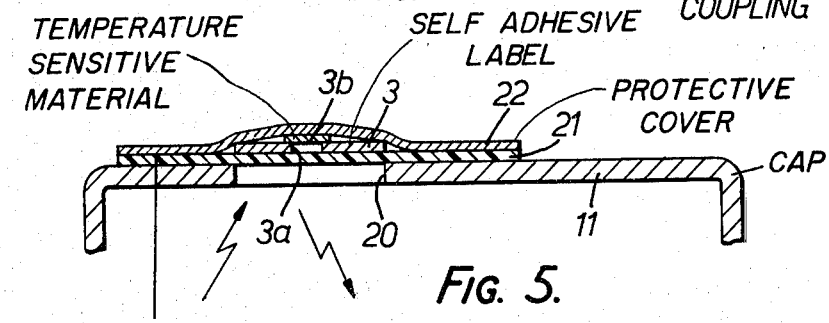

CONTROL SYSTEM INCLUDING A TEMPERATURE-RESPONSIVE VARIABLE OPTICAL PARAMETER SENSOR

This application is a continuation of application Ser. No. 58,118, filed July 16, 1979, now abandoned.

BRIEF DESCRIPTION OF THE PRIOR ART

This invention relates to a temperature responsive device which in one form may comprise a fuse of thermal overload device for a load supplied from an electrical supply, or in another form may comprise a temperature measuring equipment.

Mechanically-acting fuses are known which effect an irreversible interruption in the current path to a load when a predetermined temperature of the fuse is exceeded. One type of fuse comprises two connector posts with a bridging contact bar secured to these posts by an alloy (for example a low melting alloy). A spring presses against the contact bar so that the contact bar snaps open at the predetermined temperature at which the alloy melts. This is an irreversible fuse and, unlike bimetallic thermal switches, keeps the electrical circuit broken even if the temperature subsequently drops. The fuse is destroyed and must be replaced by another, requiring service personnel. This irreversible function is used as a protective safeguard against overheating in some types of equipment, for example hairdryers: once the apparatus has overheated and the fuse has irreversibly blown, then the cause of the overheating must be located and corrected by skilled personnel and a new fuse must be installed. Irreversible fuses are gaining in favour and regulations by electrical associations and even governments tend to require them as safeguards in certain kinds of apparatus.

Mechanically-acting fuses exhibit poor technical sophistication and low reliability and are costly to produce.

Semiconductor technology offers greater sophistication and reliability and low cost. It is known to employ semiconductor temperature-dependent resistors and these exhibit an abrupt increase in resistance at a predetermined temperature to reduce the current supply to a load. However, when the temperature subsequently drops, the original resistance value is re-established and the full current is again supplied, resulting in thermal overload again. Thus, the user can continue to use the apparatus and this can be dangerous because no skilled repair of the basic fault is enforced.

Electrical or electronic thermal protective circuits are also known. The electrical supply is connected to a load through a thermal protective circuit which includes a sensor responsive to temperature. When a predetermined temperature is exceeded, the circuit is actuated and this may completely break the supply to the load and effect a latch to hold the circuit in this state. A disadvantage of both the temperature dependent resistance device and the thermal protective circuit is that it is not always possible to position the necessary sensor at the critical part of the apparatus.

SUMMARY OF THE INVENTION

The present invention provides a temperature responsive device, comprising a temperature sensor having a light-reflective or light-transmissive characteristic which varies with temperature, and means arranged to receive light reflected from or transmitted through said sensor and to provide an output in accordance with the state of said characteristic.

The sensor may comprise a known temperature indicator of the type comprising a label of synthetic plastic or the like having a temperature sensitive region formed thereon. At a predetermined temperature, this region changes its total light reflectance or light transmittance or its colour and the receiver responds to this. The sensor may depend for its operation on natural light or upon the provision of an appropriate light source. In any event, the light source and receiver may be remotely positioned from the sensor. Light coupling may be effected by optical fibres.

The temperature responsive device may be embodied as a temperature measuring equipment to provide temperature measurement at a remote location, with the output signal of the receiver being representative of a parameter of the sensor-characteristic (which changes gradually with temperature) and therefore of the temperature. The equipment, including its measuring circuits, need be less complex than for thermocouple temperature measuring equipment. The sensor may instead include a plurality of temperature sensitive areas which exhibit abrupt changes at different predetermined temperatures.

In the case of a fuse, the output of the receiver may control a control means which connects the electrical supply to the load, the arrangement being such that the circuit is broken when the load exceeds a predetermined temperature.

BRIEF DESCRIPTION OF THE DRAWING

Embodiments of the present invention will now be described, by way of examples only, with reference to the accompanying drawings, in which:

FIG. 3 is a schematic diagram of a modification in which variation in the transmitting characteristic of the sensor is relied upon;

FIG. 4 is a schematic section through an embodiment of fuse in accordance with this invention;

FIG. 5 is a similar view through a modified fuse; and

FIG. 6 is a schematic diagram of a temperature measuring equipment in accordance with this invention.

DETAILED DESCRIPTION

Figure 1:
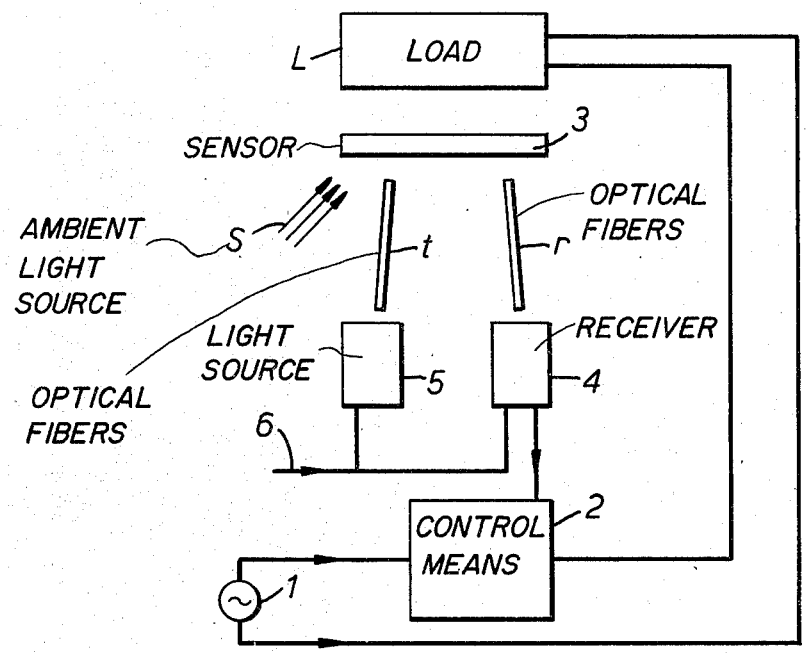
FIG. 1 is a schematic diagram of a temperature responsive device in accordance with this invention, embodied as a fuse.
Figure 2:
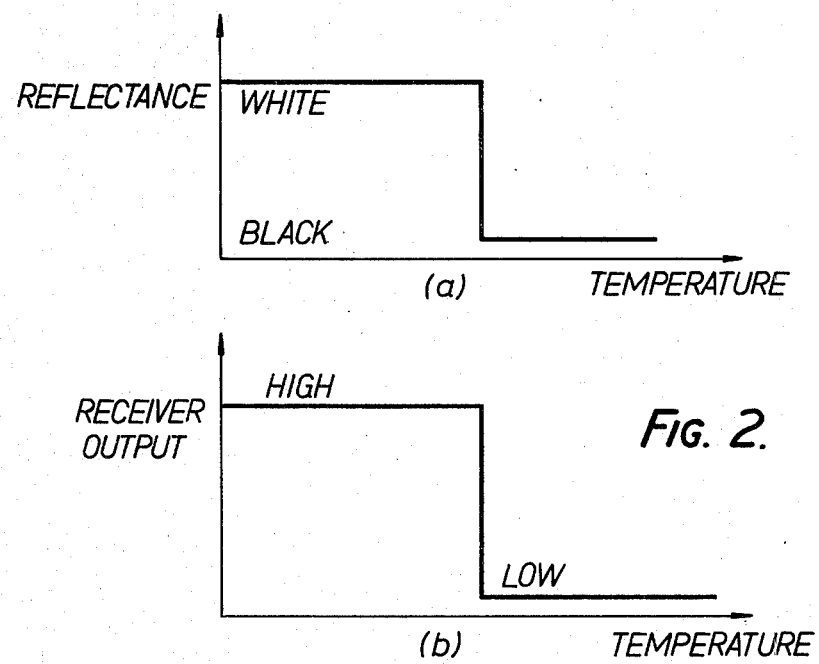
FIG. 2 comprises graphs (a) and (b) showing, respectively, variations of the reflectance of sensor 3 in FIG. 1 and of the receiver output with temperature.

In FIG. 1, an electrical supply 1 is connected to a load L through a control means 2. A sensor 3 is provided in thermal contact with the load L and is arranged to reflect light to a receiver 4 the output of which controls the control means 2. The light incident upon the sensor 3 may be natural light S or may be provided by a light source 5. Electrical supply to activate the source 5 and receiver 4 is shown at 6 and optical fibres t, r may be provided to guide the light from the source 5 to the sensor and from the sensor to the receiver 4. In operation as a fuse, the sensor exhibits a change in its reflective characteristic with temperature and the output from the receiver is such as to control the control means to reduce the electrical power supplied to the load L. The change in the reflective characteristic may be gradual or abrupt and it may be reversible or irreversible, according to requirements. FIG. 2 shows a possible abrupt characteristic, in which the sensor changes colour from white to black at a predetermined temperature, causing an abrupt change (from high to low) of the receiver output signal.

FIG. 3 shows a modification to the device of FIG. 1, in which the light-transmissive characteristic of the sensor is employed. Natural light or light from the source 5 passes through the sensor 3 to the receiver 4. FIG. 3 also indicates the possibility of using optical fibres t, r to couple light from the source 5 to the sensor 3 and from the sensor to the receiver 4.

FIG. 4 shows an embodiment of fuse comprising a metal housing formed of a base plate 10 and a cap 11 which is hermetically sealed to the base plate around a peripheral flange 11a of the cap. A heating element or load L of the apparatus being protected is thermally coupled to the cap 11 and the sensor 3 is applied to the inside top wall of the cap. An electrical circuit, comprising semiconductor devices providing the light source 5, receiver 4 and control means 2, is mounted on the base plate and is connected in series between one pole of the A.C. electrical supply 6 and the heating element L by two connector posts 12,13 which pass through, but are insulated from, the base plate 10. In this example, the source 5 (for example an infrared-emitting diode), receiver 4 and control means 2 (for example including a triac) are shown as separate semiconductor chips, but in general multi-chip, single-chip, monolithic, or thick or thin film technologies may be employed.

FIG. 5 shows a modification of fuse which is readily repairable. A window 20 is formed in the top wall of the cap 11 and is covered by an element of transparent adhesive sheet material 21. The sensor 3 is positioned on the transparent element 21 over the window 20 and a protective cover 22, comprising a piece of metal foil, is secured over the sensor 3 and transparent element 21. The sensor 3 comprises a known temperature indicator in the form of a self-adhesive label of plastics or the like sheet material provided with a transparent window 3a behind which is mounted an element 3b of temperature-sensitive material, so that the temperature indicating region is a dot. For example, this element of temperature sensitive material turns from white to black upon overheating, whereupon the fuse becomes non-conducting. The repair of the fuse comprises simply replacing the blackened temperature indicator by a fresh one.

It will be appreciated that, in accordance with the invention, the temperature sensor may be positioned remote from light source, receiver and control means. This enables the sensor to be positioned where it may be subjected to high voltages, without risk of affecting the other components.

FIG. 6 shows diagrammatically a temperature measuring equipment comprising the sensor 3 at the location at which temperature is to be measured, together with light source 5 and receiver 4. The output of the receiver 4 is coupled to a measuring means 30 which provides an indication of the temperature sensed by sensor 3. Sensor 3 may have a characteristic which varies gradually with temperature or it may include a plurality of temperature sensitive dots 31 which change colour abruptly at different temperatures, the receiver having a corresponding plurality of photodiodes 32 and providing an output indication according to which dot or dots change colour.

In each of the embodiments shown, the light-reflective or light-transmissive characteristic may exhibit a change in the total light reflectance or light transmittance, for example a change from white to black. Alternatively, the change may be a change in colour-selection, so that a change occurs in the wavelengths of light reflected or transmitted by the sensor.

Particularly in FIG. 6, the temperature indicator may be adhesive over its front surface. Suitable materials and chemical compositions for the temperature-sensitive areas are well known and commercially available. For materials exhibiting a reversible colour characteristic, liquid crystals may be used. Material specifications and information is contained in a booklet by NCR Appleton Papers Division, 3400 South Dixie Ave., Dayton, Ohio, U.S.A. "Chameleon Brand of Encapsulated Liquid Crystals", which also includes a list of supplementary references. Another example is a paint employing appropriate pigments. For example, a 60° C. abrupt characteristic is obtained from a composition of 50 grams of Cobalt acetate milled into a resin like 100 grams "Badacryl" (supplied under this Trade Mark by Imperial Chemical Industries, England) and 50 grams of a convenient solvent to provide a paint composition.

For irreversible compositions, a paint composition may be prepared for a 235° C. characteristic by 50 grams hydrated ferric oxide, 100 grams "Badacryl" resin and a solvent. Another example is to take a very pure chemical with an exact melting point (for example a polymer, a wax, etc) and coat this on a black paper, the black paper no longer being visible under the coating. Upon melting at the predetermined temperature, the liquid chemical from the coating is absorbed by the paper, or alternatively upon cooling goes from opaque to translucent. In either case, the black paper becomes visible.

Another example of an irreversible mixture is a mixture of the chemicals orthochloronitrobenzene and orthobromoritrobenzene.

The predetermined temperature of colour-change can in all cases be varied by controlling the ratio of the mixed components.

I claim:

1. An electronic fuse, comprising
   (a) a casing containing a chamber, and a window opening (20) communicating with said chamber;
   (b) a semiconductor circuit mounted in said chamber, said circuit including a light-emitting device (5) and a photo-responsive device (4);
   (c) a temperature sensor means removably mounted on the external surface of said casing opposite said window opening,
      (1) said sensor means including
         (a) a self-adhesive label layer (3) mounted over said window, said label layer containing a transparent second opening (3a); and
         (b) a temperature-sensitive element (3b) mounted opposite said second opening;
      (2) said sensor means being arranged to receive light radiated to it from said light emitting device and to reflect said light to said photo-responsive device, said sensor means having a light-reflective characteristic which varies with temperature;
   (d) an electrical load, said sensor means being arranged to sense the temperature of said load;
   (e) a source of electrical power; and
   (f) control means (2) electrically connected with said photo-responsive device for controlling the supply of electrical power to said load in such a manner that a change in the light-reflective characteristic of said sensor means at a predetermined temperature causes cessation of the supply of electrical power to the load.

2. A fuse as defined in claim 1, wherein said sensor means has a light-reflective characteristic that exhibits an irreversible change with change in temperature.

3. A device as defined in claim 1 or 2, wherein said sensor means has a light-reflective characteristic that exhibits a change in total reflectance with change in temperature.

4. A device as defined in claim 1 or 2, wherein said sensor means has a light-reflective characteristic that exhibits a change in color-selection with change in temperature.

5. A device as defined in claim 1, and further including first optical fiber means optically coupling said temperature sensor means to said light-emitting device, and second optical fiber means optically coupling said photo-responsive device to said temperature sensor means.

6. A device as defined in claim 1, wherein said control means comprises a semiconductor power switching device also disposed with said chamber.

* * * * *